United States Patent
Hulick, Jr.

(10) Patent No.: US 12,498,943 B2
(45) Date of Patent: Dec. 16, 2025

(54) ADVANCED AGENT INSTRUMENTATION FOR OPENTELEMETRY IMPLEMENTATIONS

(71) Applicant: Cisco Technology, Inc., San Jose, CA (US)

(72) Inventor: Walter Theodore Hulick, Jr., Pearland, TX (US)

(73) Assignee: Carbon Technology Holdings, LLC, San Jose, CA (US)

( * ) Notice: Subject to any disclaimer, the term of this patent is extended or adjusted under 35 U.S.C. 154(b) by 122 days.

(21) Appl. No.: 17/954,103

(22) Filed: Sep. 27, 2022

(65) Prior Publication Data
US 2023/0118838 A1    Apr. 20, 2023

Related U.S. Application Data

(60) Provisional application No. 63/248,862, filed on Sep. 27, 2021.

(51) Int. Cl.
G06F 9/445    (2018.01)
G06F 9/54    (2006.01)

(52) U.S. Cl.
CPC ......... *G06F 9/44521* (2013.01); *G06F 9/541* (2013.01)

(58) Field of Classification Search
None
See application file for complete search history.

(56) References Cited

U.S. PATENT DOCUMENTS

| | | |
|---|---|---|
| 8,276,125 B2 | 9/2012 | Fan et al. |
| 8,332,835 B2 | 12/2012 | Atsatt |
| 8,739,147 B2 | 5/2014 | Lebert |
| 9,015,659 B2 | 4/2015 | Raundahl Gregersen et al. |
| 9,411,616 B2 | 8/2016 | Gagliardi |

(Continued)

FOREIGN PATENT DOCUMENTS

CN    111309402    6/2020

OTHER PUBLICATIONS

International Search Report and Written Opinion for International Application No. PCT/US2022/044919, mailed Jan. 2, 2023, 13 Pages.

(Continued)

*Primary Examiner* — Umut Onat
(74) *Attorney, Agent, or Firm* — Lee & Hayes, P.C.; James M. Behmke

(57) ABSTRACT

In one embodiment, a method herein comprises: intercepting runtime calls from a telemetry invocation for method entry to discover loaders; determining whether an implementation tenant is already allocated for a particular discovered loader; allocating, in response to no implementation tenant being already allocated for the particular discovered loader, a particular implementation tenant from a plurality of available implementation tenants, wherein a corresponding loader for the particular implementation tenant is set to delegate from the particular discovered loader; and calling, in response to the particular implementation tenant being allocated or being already allocated for the particular discovered loader, a method entry for the particular implementation tenant to perform an associated interception operation while using direct telemetry class and/or method calls.

19 Claims, 18 Drawing Sheets

(56) References Cited

U.S. PATENT DOCUMENTS

| | | | |
|---|---|---|---|
| 11,665,241 B1* | 5/2023 | Wade | H04L 41/08 709/227 |
| 2009/0177761 A1* | 7/2009 | Meyer | H04L 67/564 709/219 |
| 2013/0152064 A1* | 6/2013 | Gagliardi | G06F 9/44521 717/166 |
| 2018/0081740 A1* | 3/2018 | Syed | G06F 8/76 |
| 2018/0137296 A1* | 5/2018 | Cahana | G06F 21/629 |
| 2021/0247966 A1 | 8/2021 | Hulick, Jr. | |
| 2022/0350725 A1* | 11/2022 | Lydick | G06F 8/48 |

OTHER PUBLICATIONS

Belyaev, Andrey, "Think Twice Before Using Reflection", online: https://dzone.com/articles/think-twice-before-using-reflection, first online Apr. 9, 2019, accessed Jan. 21, 2022, 4 pages, DZone.com.

"Do Not Use Reflection • Java for small teams", online: https://ncrcoe.gitbooks.io/java-for-small-teams/content/specifics/1000_do_not_use_reflection.html, accessed Jan. 21, 2022, 2 pages, ncrcoe.gitbooks.io.

"Reflection API: Reflection. The Dark Side of Java", online: https://codegym.cc/groups/posts/45-reflection-api-reflection-the-dark-side-of-java, first online Sep. 12, 2018, accessed Jan. 21, 2022, 12 pages, codegym.cc.

"Manual Instrumentation", online: https://opentelemetry.io/docs/instrumentation/java/manual_instrumentation/, accessed Jan. 21, 2022, 10 pages, opentelemetry.io.

"Interface Span", online: https://javadoc.io/doc/io.opentelemetry/opentelemetry-api/latest/io/opentelemetry/api/trace/Span.html, version 1.10.1, accessed Jan. 21, 2022, 12 pages, javadoc.io.

"OpenTelemetry Instrumentation for Java", online: https://github.com/open-telemetry/opentelemetry-java-instrumentation#readme, accessed Jan. 25, 2022, 6 pages, Github.com.

"Interface SpanBuilder", online: https://javadoc.io/doc/io.opentelemetry/opentelemetry-api/latest/io/opentelemetry/api/trace/SpanBuilder.html, version 1.101, accessed Jan. 25, 2022, 7 pages, javadoc.io.

"Group io.opentelemetry", online: https://javadoc.io/doc/io.opentelemetry, accessed Sep. 27, 2022, 3 pages.

"Open Telemetry API", online: https://javadoc.io/doc/io.opentelemetry/opentelemetry-api/latest/index.html, accessed Sep. 27, 2022, 1 page.

"Package io.opentelemetry.sdk", online: https://javadoc.io/doc/io.opentelemetry/opentelemetry-sdk/latest/io/opentelemetry/sdk/package-summary.html, accessed Sep. 27, 2022, 1 page.

"Open-telemetry / opentelemetry-java-instrumentation", online: https://github.com/open-telemetry/opentelemetry-java-instrumentation, accessed Sep. 27, 2022, 6 pages.

"Opentelemetry-sdk-tracing 0.11.0 API", online: https://javadoc.io/doc/io.opentelemetry/opentelemetry-sdk-tracing/latest/index.html, accessed Sep. 27, 2022, 1 page.

"Interface Span", online: https://javadoc.io/static/io.opentelemetry/opentelemetry-api-trace/0.13.1/io/opentelemetry/api/trace/Span.html, accessed Sep. 27, 2022, 11 pages.

* cited by examiner

505 ⟶

- proxy: true
  handler: com.cisco.mtagent.instrumentation.InstrumentationClassLoadingProxyInternalHandler
  active: true

515 ⟶

- class: io.opentelemetry.api.trace.SpanBuilder
  method: startSpan
  handler: com.cisco.argento.methodhandlers.OTDelegateMethodHandler
  catch: true
  delegate: true
  load-from: argento-tenant.jar

FIG. 5

```
605 ──▶
public Span startSpan(String name) {
    com.cisco.mtagent.boot.instrumentation.MethodEntryAndExit.methodEntryControl(...)
}

╱── 615
public void handlerEntry(Object inst, Object[] args, String className, String method, String signature, String ruleIdString) {
    // Get All RuleIds represented in this intercept call
    String[] ruleIds = ruleIdString.split(InstrumentMethod.RULE_ARG_SEPARATOR);
    for (String id : ruleIds) {
        // Get Delegate for this Rule ID + ClassLoader
        DelegateMethodHandlerInfo = delegateMethodHandlerInfoMap.get(id);
        // Need Delegate loaded - 1 Per Handler Name, and Per ClassLoader - do they exist?
        for (String handler : delegateMethodHandlerInfo.handlerNames) {
            String key = handler + ":" + controller.getLoaderObjectString(inst);
            MethodHandler delegateMethodHandler = delegateMethodHandlerHash.get(key);
            if (delegateMethodHandler == null) {
                delegateMethodHandler = createDelegateMethodHandlerAtRuntime(delegateMethodHandlerInfo, handler, inst);
                delegateMethodHandlerHash.put(key, delegateMethodHandler);
            }
            delegateMethodHandler.handlerEntry(inst, args, className, method, signature, id);
        }
    }
}
```

FIG. 6

```
public MethodHandler createDelegateMethodHandlerAtRuntime(DelegateMethodHandlerInfo
delegateMethodHandlerInfo, String handler, Object inst) {
    try {
        delegateId++;
        int index = handler.lastIndexOf(".");
        String newDelegateTenantName = handler.substring(index + 1) + "-delegate-" + delegateId;
        String newDelegateMethodHandlerName = handler + "-delegate-" + delegateId;
        ClassLoader hisLoader = inst.getClass().getClassLoader();
        TenantRegistry = AgentPicoContainer.getInstance(TenantRegistry.class);
        AgentTenant delegateAgentTenant = tenantRegistry.createDelegateTenant(newDelegateTenantName,
        delegateMethodHandlerInfo.agentTenant);
        TenantClassLoader newDelegateTenantLoader = (TenantClassLoader) delegateAgentTenant.getLoader();
        // Get the Delegate Method Handler bytes
        byte[] bytes = getDelegateMethodHandlerBytes(handler, delegateMethodHandlerInfo.agentTenant.getLibDir()
        + File.separator + delegateMethodHandlerInfo.loadJar,
        newDelegateMethodHandlerName);
        TODO: Add to Tenant Loader to Delegate to the instrumented classes loader - delegate us first
        if (inst != null && hisLoader != null) {
            newDelegateTenantLoader.addDelegateLoader(hisLoader);
        }
```

CONTINUED FROM FIG. 7A

```
// Create the Class
newDelegateTenantLoader.defineClass(newDelegateMethodHandlerName, bytes);
// Verify class creation
Class clazz = Class.forName(newDelegateMethodHandlerName, true, newDelegateTenantLoader);
// Cast to MethodHandler
MethodHandler delegateMethodHandler = (MethodHandler) clazz.newInstance();
// Initialize it
delegateMethodHandler.initHandler(newDelegateMethodHandlerName, this.agentHome, this.agentArgs, this.instrumentation);
logger.log("Created Delegate Method Handler in Tenant Class Loader " + newDelegateTenantLoader);
return delegateMethodHandler;
} catch (Throwable t) {
    logger.logWarning(false, "Could not create delegate at runtime " + logger.getStackTrace(t));
    return null;
}
}
```

FIG. 7B

```
// We will pull Classes from these loaders
public void addDelegateLoader(ClassLoader deletegateLoader) {
    if (delegateToLoaders == null) {
        delegateToLoaders = new HashSet<>();
    }
    delegateToLoaders.add(deletegateLoader);
}

@Override
protected Class<?> loadClass(String name, boolean resolve) throws ClassNotFoundException {
    Class<?> loadedClass = null;
    // List of delegate loaders - we load from them first
    if (delegateToLoaders != null && !name.startsWith(MT_AGENT_PACKAGE_PREFIX)) {
        try {
            for (ClassLoader : delegateToLoaders) {
                loadedClass = classLoader.loadClass(name);
            }
        } catch (Exception e) {
        }
    }
    // has the class loaded already?
    if (loadedClass == null) {
        loadedClass = super.loadClass(name, resolve);
    }
    return loadedClass;
}
```

FIG. 8

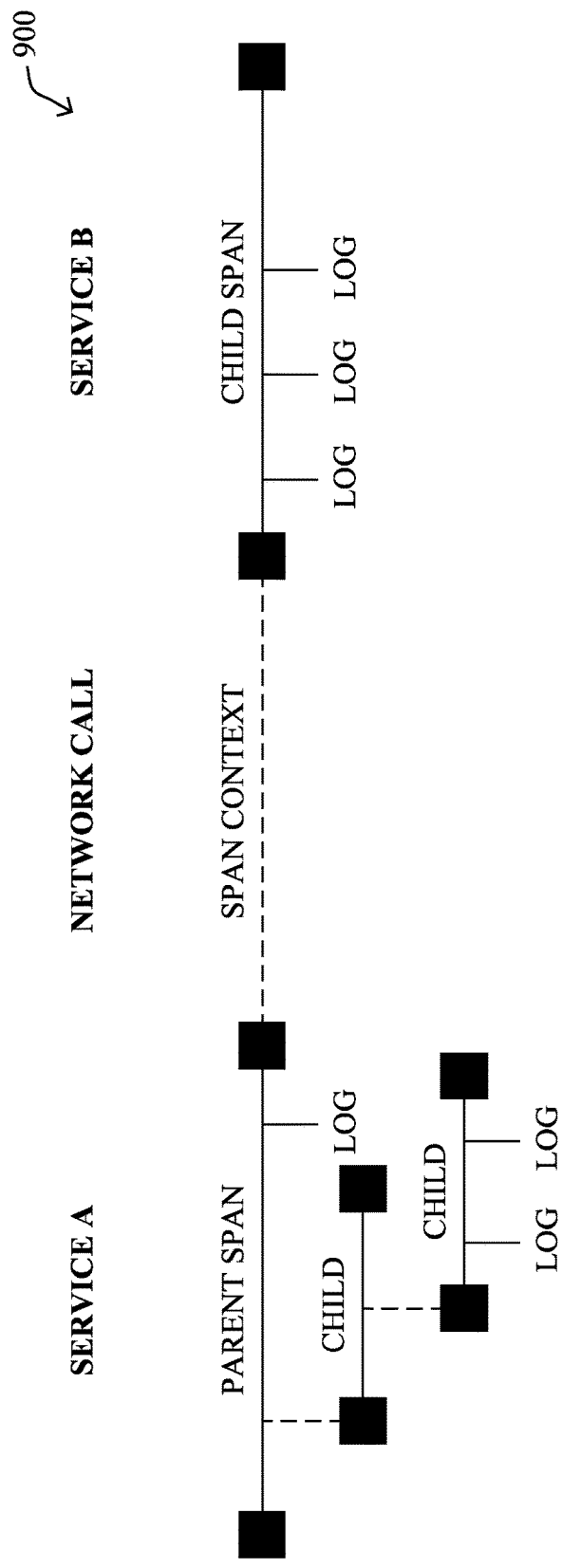

1. Trace: The description of a transaction as it moves through a distributed system.

2. Span: A named, timed operation representing a piece of the workflow. Spans accept key:value tags as well as fine-grained, timestamped, structured logs attached to the particular span instance.

3. Span context: Trace information that accompanies the distributed transaction, including when it passes the service to service over the network or through a message bus. The span context contains the trace identifier, span identifier, and any other data that the tracing system needs to propagate to the downstream service.

FIG. 9

```
class MyClass {
    private static final Tracer tracer =
        openTelemetry.getTracer("instrumentation-library-name", "1.0.0");
    void doWork() {
        Span span = tracer.spanBuilder("MyClass.DoWork").startSpan();
        try (Scope ignored = span.makeCurrent()) {
            Span.current().addEvent("Starting the work.");
            doWorkInternal();
            Span.current().addEvent("Finished working.");
        } finally {
            span.end();
        }
    }
}
```

FIG. 10

```
// Create opentelemetryextension-impl-1, opentelemetryextension-impl-2, etc.
for (int i = 0; i < implementationsHandled; i++) {
  String name=TENANT_IMPLEMENTATIONS_PREFIX + (i + 1);
  // Wrapper class for the implementation - Current Tenant loaders have no handlers
  ImplementationClass implementationClass=new ImplementationClass(name, (TenantClassLoader)mtAgentTenantAPI.
  getTenantLoader
  (name));
  implementationHash.put(name, implementationClass);
  implementationList.add(implementationClass);
  // Load bytes for OpenTelemetryExtensionMethodHandlerReal.class - and then rename to match Tenant loaders:
  opentelemetryextensionimpl-1, opentelemetryextension-impl-2, etc.
  byte[] bytes = getImplementationMethodHandlerBytes(BASE_CLASS_TO_CLONE, name);
  // Save the bytes until implementation time
  implementationClass.bytes=bytes;
  mtAgentTenantAPI.log("Initializing Implementation "+implementationClass.name+", loader: "+implementationClass.tenantClassLoader+",
  bytes:   "+implementationClass.bytes);
```

```
public byte[] getImplementationMethodHandlerBytes(String baseHandler, String className) throws Exception {
try {
ClassUtils classUtils = AgentPicoContainer.getInstance(ClassUtils.class);
// I have 1 jar in implementation Tenant Loader which is the handler
URL myURL = tenantLoader.getURLs()[0];
File jarf = Paths.get(myURL.toURI().toFile();
// Get raw bytes for the Implementation Class from jar
byte[] bytes = classUtils.getClassBytesFromJar(jarf.getAbsolutePath(), baseHandler);
// Make a CtClass - this is NOT a real Java Class yet
ClassPool cp = ClassPool.getDefault();
CtClass ctClass = cp.makeClass(new java.io.ByteArrayInputStream(bytes));
// Rename it
String name = PACKAGE_NAME + "." + className;
ctClass.setName(name);
// Get bytes for renamed class
bytes=ctClass.toBytecode();
return bytes;
} catch (Throwable t) {
mtAgentTenantAPI.logWarning("Error initting implementation Method Hander...");
return null;
}
}
```

FIG. 11B

```
public void handlerEntry(Object inst, Object[] args, String className, String method, String signature, String id) {
    ClassLoader implLoader = inst.getClass().getClassLoader();
    // Do we have implementation Handler for this Loader? If not - get one
    ImplementationClass implementationClass = implementationAllocationMap.get(implLoader);
    if (implementationClass == null) {
        // Allocate Implementation
        implementationClass = allocateImplementation(inst, implLoader);
        mtAgentTenantAPI.log("Allocating new Implementation Class "+implementationClass.name+" to handle loader "+implLoader);
    }
    mtAgentTenantAPI.log("Calling implementation handler "+implementationClass.name+" to handle loader "+implLoader);
    // Call the Implementation Handler
    implementationClass.tenantMethodHandler.handlerEntry(inst, args, className, method, signature, id);
```

```
private synchronized ImplementationClass allocateImplementation(Object inst, ClassLoader implLoader) {
try {
// We have max allocated Implementations
if (implementationsInUse == implementationsHandled) {
throw new Exception("Maximum implementations are reached...can't monitor any more implementation...");
}
// Get one if available
ImplementationClass implementationClass=implementationList.get(implementationsInUse);
implementationsInUse++;
// Add to Tenant Loader to Delegate to this loader
implementationClass.tenantClassLoader.addDelegateLoader(implLoader);
// Create the Implementation Tenant Handler on the fly
implementationClass.tenantMethodHandler = createImplementationClassAndHandler(implementationClass);
mtAgentTenantAPI.log("Allocating implementation Method Handler " + implementationClass.tenantMethodHandler + " to handle implementation found in Class Loader " + implLoader);
// Mark this as Allocated to this loader
implementationAllocationMap.put(implLoader, implementationClass);
return implementationClass;
} catch (Exception e) {
mtAgentTenantAPI.logError("Exception creating real handler: " + e);
}
return null;
}
```

FIG. 12B

```java
private TenantMethodHandler createImplementationClassAndHandler(ImplementationClass implementationClass) throws Exception
{
try {
// Set the Implementation Tenant Loader class name
String className=PACKAGE_NAME +"."+implementationClass.name;
// Load bytes directly into TenantclassLoader
implementationClass.tenantClassLoader.defineClass(className, implementationClass.bytes);
// Verify class creation
Class clazz = Class.forName(className, true, implementationClass.tenantClassLoader);
// Cast to TenantMethodHandler
TenantMethodHandler implementationMethodHandler = (TenantMethodHandler) clazz.newInstance();
// Initialize it
implementationMethodHandler.initHandler(implementationClass.name, this.agentHome, this.agentArgs, this.instrumentation);
mtAgentTenantAPI.log("Created implementation handler " + implementationMethodHandler + " into Classloader " +
implementationMethodHandler.getClass().getClassLoader());
return implementationMethodHandler;
}
catch(Throwable t) {
mtAgentTenantAPI.log("Error: "+t);
return null;
}
}
```

```
public void addDelegateLoader(ClassLoader deletegateLoader) {
    if (delegateToLoaders == null) {
        delegateToLoaders = new HashSet<>();
    }
    delegateToLoaders.add(deletegateLoader);
}

@Override
protected Class<?> loadClass(String name, boolean resolve) throws ClassNotFoundException {
    Class<?> loadedClass = null;
    if (delegateToLoaders != null && !name.startsWith(MT_AGENT_PACKAGE_PREFIX)) {
        try {
            for (ClassLoader classLoader : delegateToLoaders) {
                loadedClass = classLoader.loadClass(name);
            }
        } catch (Exception e) {
        }
    }
    // has the class loaded already?
    if (loadedClass == null) {
        loadedClass = super.loadClass(name, resolve);
    }
    return loadedClass;
} public void defineClass(String className, byte[] bytes) {
    super.defineClass(className, bytes, 0, bytes.length);
}
```

ADVANCED AGENT INSTRUMENTATION FOR OPENTELEMETRY IMPLEMENTATIONS

RELATED APPLICATION

This application claims priority to U.S. Prov. Appl. Ser. No. 63/248,862, filed Sep. 27, 2021, entitled ENHANCED APPLICATION INSTRUMENTATION USING ADVANCED CLASSLOADING, by Walter Theodore Hulick, Jr., the contents of which are incorporated herein by reference.

TECHNICAL FIELD

The present disclosure relates generally to computer systems, and, more particularly, to advanced agent instrumentation for OpenTelemetry™ implementations.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

OpenTelemetry™ (or "Open Telemetry", "OTEL", etc.) represents a massive shift from proprietary application monitoring systems, such as application performance monitoring (APM) solutions, to an infrastructure that leverages application programming interfaces (APIs) that are standardized and open. OpenTelemetry™ implementations can be shared by all applications or could be specific to a single application. Notably, the instrumentation of OpenTelemetry™ APIs not only requires the ability to find the implementations, but also that the correct Class can be loaded in the correct implementation so that the instrumentation can actually use the classes. Current instrumentation techniques, however, have not yet managed to keep up with the complexities of instrumenting OpenTelemetry™.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 5 illustrates an example of code for enhanced application instrumentation using advanced ClassLoading, particularly for specifying proxy and delegate instrumentation modules;

FIG. 6 illustrates another example of code for enhanced application instrumentation using advanced ClassLoading, particularly for applying the proxy;

FIGS. 7A-7B illustrate another example of code for enhanced application instrumentation using advanced ClassLoading, particularly for creating the delegate;

FIG. 8 illustrates another example of code for enhanced application instrumentation using advanced ClassLoading, particularly for adding the delegation to application class loader (to directly access the Application's class);

FIG. 9 illustrates an example of an OpenTelemetry architecture;

FIG. 10 illustrates a specific example of code to create and end a span;

FIGS. 11A-11B illustrate example code to create implementation class bytes that are to be allocated upon discovery of new OpenTelemetry implementations;

FIGS. 12A-12C illustrate further example code for runtime allocation of implementation handlers/tenants to discovered loaders;

FIG. 13 illustrates an example of a code to add a "Delegation Loader" to an existing class loader.

DESCRIPTION OF EXAMPLE EMBODIMENTS

Overview

According to one or more embodiments of the disclosure, an illustrative method herein may comprise: intercepting, by a process, runtime calls from a telemetry invocation for method entry to discover loaders; determining, by the process, whether an implementation tenant is already allocated for a particular discovered loader; allocating, by the process and in response to no implementation tenant being already allocated for the particular discovered loader, a particular implementation tenant from a plurality of available implementation tenants, wherein a corresponding loader for the particular implementation tenant is set to delegate from the particular discovered loader; and calling, by the process in response to the particular implementation tenant being allocated or being already allocated for the particular discovered loader, a method entry for the particular implementation tenant to perform an associated interception operation while using direct telemetry class and/or method calls.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
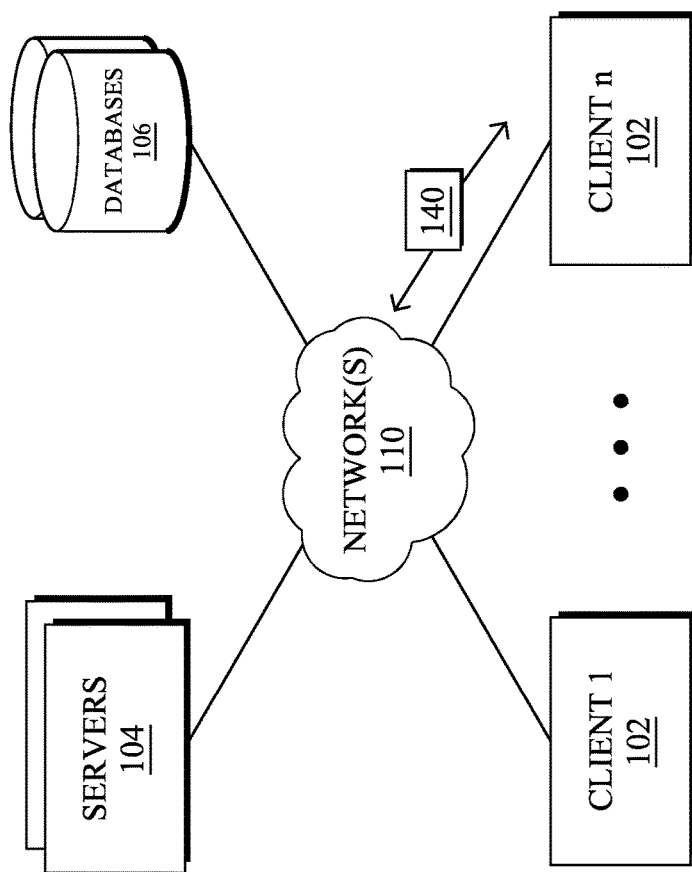
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
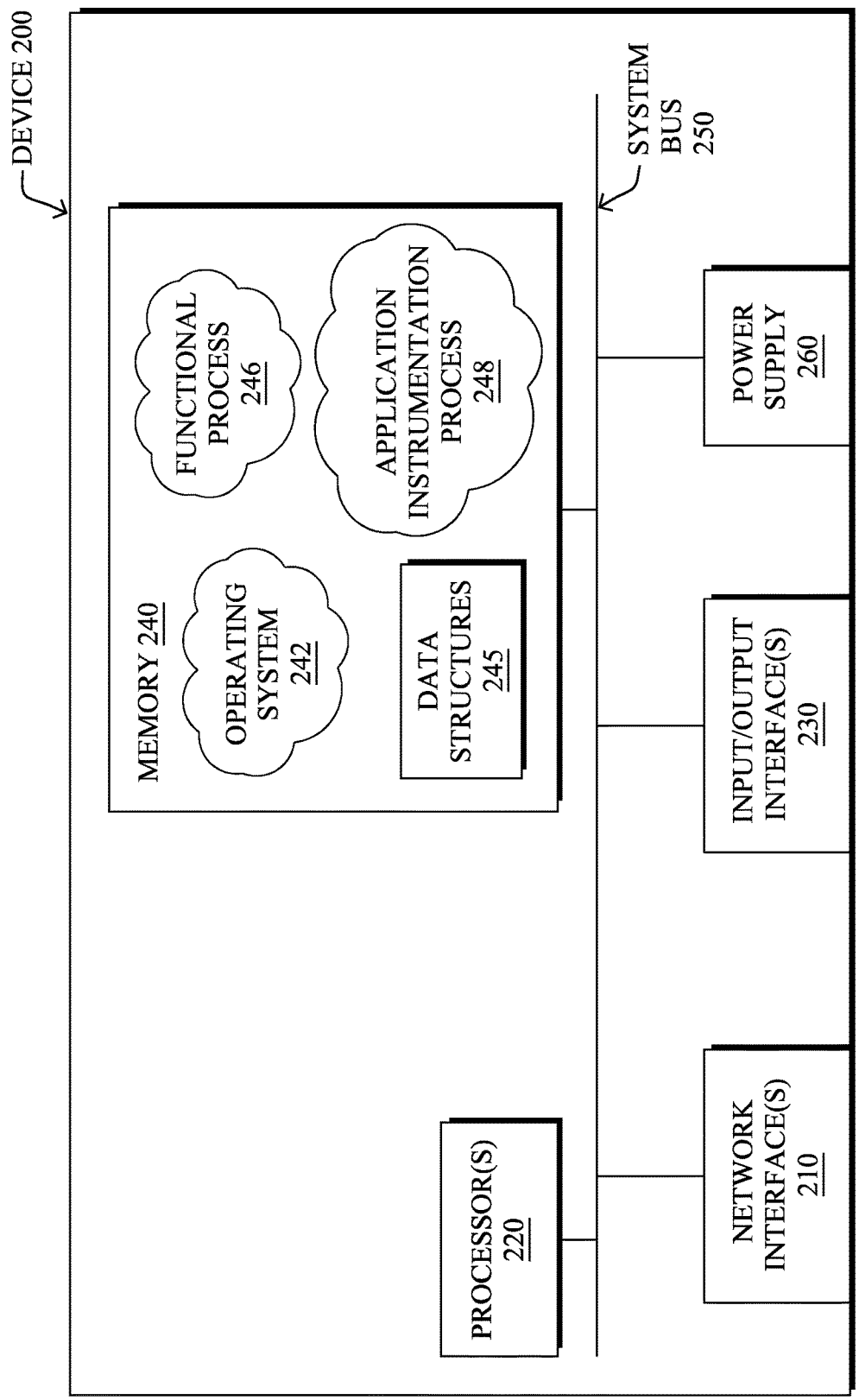
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "application instrumentation" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Observability Intelligence Platform—

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java™ agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
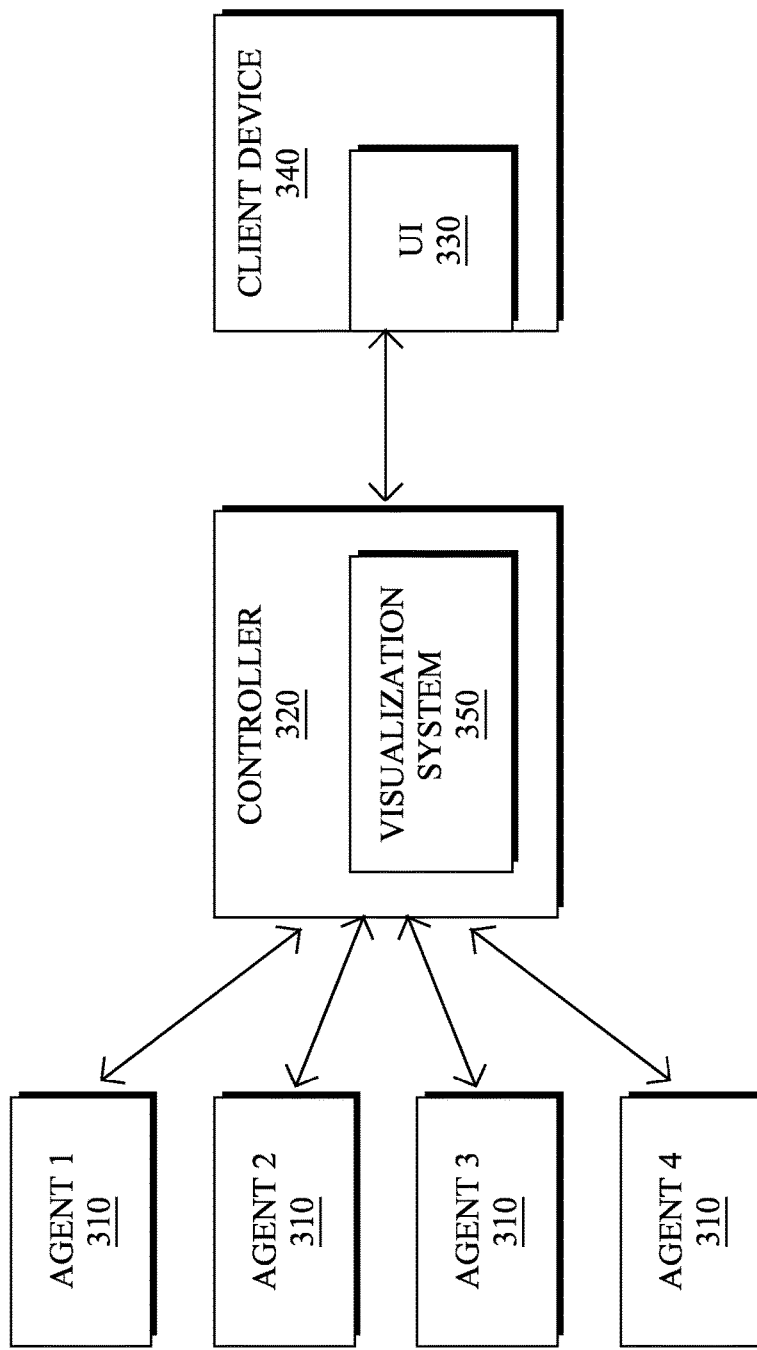
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page— e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the observability intelligence platform 300. In an illustrative on-premises (On-Prem) implementation, a controller instance 320 may be installed locally and self-administered.

The controllers 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java™ program) installed on a machine that has network access to the monitored databases and the controller. Standalone machine agents, on the other hand, may be standalone programs (e.g., standalone Java™ programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript™ agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the eXtensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

—Multi-Tenant Java Agent Instrumentation System—

As noted above, a Java™ agent can be used for purposes of instrumenting a Java™ application. In general, a Java™ agent takes the form of a Java™ class that implements a premain method. Similar to the main method in a Java™ application, the premain method acts as an entry point for the agent. When the Java Virtual Machine (JVM) initializes, the premain method is called before calling the main method of the Java™ application. The Java™ agent may also include an agentmain method that can be used, after startup of the JVM. This allows the Java™ agent to be loaded either in a static manner (e.g., using premain as part of the JVM initialization) or in a dynamic manner, such as by using the Java™ attach API to call the agentmain method of the agent while the JVM is already running.

Associated with a Java™ agent may be a manifest that specifies a set of attributes for the agent, as follows:

TABLE 1

| Manifest Attribute | Description |
| --- | --- |
| Premain-Class | This attribute defines the Java agent class that includes the premain method to be used when the JVM initializes. |
| Agent-Class | This attribute defines the Java agent class that includes the agentmain method to be used after the JVM initializes. |
| Boot-Class-Path | This attribute specifies a list of paths to be searched by the bootstrap class loader. |
| Can-Redefine-Classes | This optional, Boolean attribute specifies whether the agent can redefine classes, with a default value of 'false.' |
| Can-Retransform-Classes | This optional, Boolean attribute specifies whether the agent can retransform classes, with a default value of 'false.' |
| Can-Set-Native-Method-Prefix | This optional, Boolean attribute specifies whether the agent can set native method prefix, with a default value of 'false.' |

When used, the Java™ agent can instrument the application via any or all of the following approaches:
  Redefining or retransforming classes at runtime to change the bodies of methods, the constant pool, and/or attributes.
  Modifying the failure handling of methods to allow for retry.
  This allows the Java™ agent to monitor the performance of the application, apply security rules to the application, and the like.

Today, there are more than fifty different Java™ agents in existence. The majority of these agents are open source 'hacks' designed to transform classes at runtime for various reasons. However, there are also commercial Java™ agents that are far more popular and used primarily for purposes of application performance management (APM).

A more recent paradigm shift has emerged in the form of Runtime Application Self Protection (RASP). Similar to APM, many RASP implementations also rely on a Java™ agent to instrument the application. In this case, though, the Java™ agent applies to the instrumentation to the classes/ methods of the application that affect 'behavior,' to determine whether the security of the application has been breached. In other words, these agents are generally engineered differently than those for APM in that they are heavily focused on security events, as opposed to performance metrics.

Unfortunately, the design of Java™ agents with a specific purpose in mind forces application developers to make a choice between technologies such as APM, RASP, and the like.

Certain embodiments herein, therefore, may use a Java™ agent that allows multiple tenants to share use of the agent for purposes of instrumenting an application. In some aspects, the multi-tenant agent allows different technologies, such as APM, RASP, etc., to coexist and across different vend( )rs. In further aspects, the techniques also support the complexities of the JPMS in Java 9+, to provide proper classloading and oversee instrumentation missteps, removing the burdens associated with supporting a full Java™ agent across multiple vend( )rs.

Specifically, according to one or more embodiments described herein, a device launches a core agent for a Java™ application. The core agent loads a first tenant and a second tenant, each tenant having its own isolated class loader. The device instruments, via the core agent and by each tenant, the Java™ application to capture data regarding execution of the Java™ application. The device then provides the captured data to a user interface.

Figure 4:
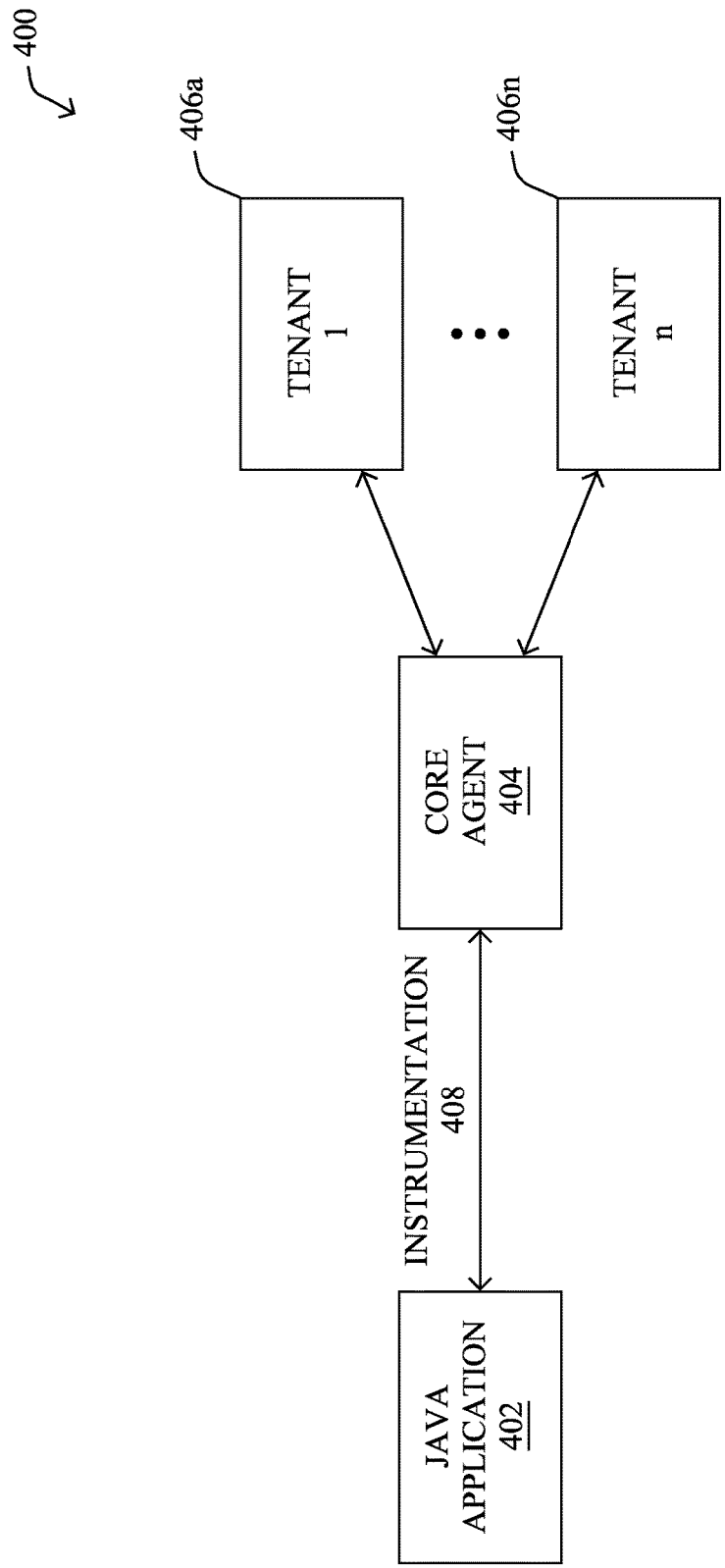
FIG. 4 illustrates an example simplified architecture for a multi-tenant agent.

Operationally, FIG. 4 illustrates an example simplified architecture 400 for a multi-tenant agent, according to various embodiments. As shown, architecture 400 may include a Java application 402, a core agent 404, and a plurality of tenants 406a-406n (e.g., a first through $n^{th}$ tenant). During operation, core agent 404 may function to insert instrumentation 408 into Java application 402 on behalf of tenants 406a-406n for any number of purposes. For example, in one embodiment, tenant 406a may be an APM utility that monitors the performance of Java application 402, while tenant 406n may be a RASP utility that implements a number of security checks within Java application 402.

In some embodiments, Java application 402 may be a Java 9+ application executed within the Java Platform Module System (JPMS) 402. As would be appreciated, a key distinction in JPMS over prior versions of Java™ is the support of 'Java modules' within an application, such as Java application 402. In general, a Java™ module may include the following information as part of a module descriptor:
A name that uniquely identifies the module.
A set of dependencies between that module and those on which it depends.
A listing of the packages that it makes available to other modules via export. Note that this must be done explicitly and that a package is implicitly unavailable to other modules, by default.
The services that are offered by the module.
The services that the module consumes.
The other modules that are allowed to use reflection with the module.

In addition to the module descriptor, each Java™ module may include any number of related packages (e.g., code) and, potentially, other resources (e.g., images, XML, etc.), as well.

More specifically, a module descriptor for a Java™ module may utilize any or all of the following directives:

exports—this directive specifies the packages of the module that are accessible by other modules.
uses—this directive specifies which service(s) are used by the module. In general, a service is an object for a class that implements an interface or extends the abstract class specified in this directive.
provides—this directive specifies that a module provides a particular service (e.g., the interface or abstract class from the uses directive), as well as the service provider class that implements it.
opens—this directive specifies the package(s) of the module that are accessible to other modules. Depending on its use, this directive can be used to allow all packages in the module to be accessed during runtime or used to limit runtime access by specified modules to certain modules.

A key feature of Java™ modules is the ability to restrict access between modules. Indeed, in Java version 8 and prior, the Reflection API could be used to access all classes in a package, including its private classes, regardless of the access specifier used. With Java™ modules, classes in packages within a module need to have permission to access a class and to perform reflection on a class. This is done by a module "exporting" itself and certain packages to another module that "reads" that module and its exported packages. In addition, a module can "open" itself to another module, to allow reflection.

To better describe the techniques herein, the following terminology is used:
ByteCode Instrumentation (BCI)—dynamically modifying Java classes for the purpose of instrumentation (e.g., instrumentation 408).
JMX MBeans—a managed Java object, similar to a JavaBeans component, that follows the design patterns set forth in the JMX specification. An MBean can represent a device, an application, or any resource that needs to be managed.
JMX Attribute—Defines a metric and metric data type exposed by the MBean.
Javassist— This is a popular BCI toolkit used to instrument classes.
Boot Class(es)—Core Java classes loaded by the "Boot Class" loader (Java bootstrap native loader).
Non-Boot Class(es)—Classes found about the Boot loader in Extension, Application, or Web Application loaders
Handler—This is an intercepting class that contains a method to call on entry into an instrumented method and method to call on exit from an instrumented method.
Transform—The act of altering the class bytes before loading.

In general, tenants 406a-406n are specific functional modules that share core agent 404 with other tenants. In some embodiments, each tenant 406 may have its own, isolated class loader designed such that tenants 406a-406n do not conflict with one another. In further embodiments, each tenant 406 may have direct access to core agent 404 via the classes in core agent 404, which is the parent for the tenant class loader. During use, each tenant 406 may reside in a specific "tenants" folder within core agent 404 and may be configured via .yaml files.

In various embodiments, core agent 404 may leverage the javaagent architecture built into Java™ and be configured via an agentConfig.yml or similar file. More specifically, core agent 404 may be divided into three areas:

Boot—this resides in the boot loader used to load Java application 402

Premain—this method resides in the application class loader and launches agent 404 to set up the Agent Loader.

Agent Loader—this is the loader for agent 404 and prevents conflicts with Java application 402. In addition, agent libraries are isolated from one another.

As noted, core agent 404 may leverage handlers, to insert instrumentation 408 into Java application 402. More specifically, handlers are instrumentation points to intercept or gain control of the method entry or exit within Java application 402 and controlled via configuration. For example, a handler may receive an object instance and all of its arguments within Java application 402, as well as the return value on exit and any exceptions that may be raised. In some embodiments, the handlers may use Reflection on any classes that are not in the boot loader (a core Java™ class), since those classes are directly accessible via a class loader designation. In further embodiments, the handlers can pass information via Thread Local and access other handlers in the same tenant 406 (e.g., using an API call). Handlers also have the option of intercepting entry/exit events and catch exceptions via configuration, as well as receive the object instance and, on exit, all arguments, the return value, and any exceptions raised. Control over a single handler can be regulated a handler file, e.g., handlername.properties.

In other words, core agent 404 may provide the following to tenants 406a-606n:

Isolation from other tenants 406 (via Classloading).

Automatic JPMS compatibility—e.g., handling the complexities of Java 9+, such as module permissions, naming, class instrumentation, conflict resolution, removal, shutdown per tenant 406 without affecting other tenants 406, security (e.g., the automatic handling of tenant permissions for Java Security Manager), etc.

Automatic thread naming based on the name of a tenant 406 (e.g., to ID tenant threads in stack sampling).

Automatic monitoring of tenant instrumentation measuring latency, CPU, etc. (and, if needed, to automatically remove the instrumentation).

Implementation of Async handling callbacks.

Ability to instrument anonymous classes, such as Lambda's, functions, inner classes, and the like.

Logging and log management.

Support for new technologies.

Context launch.

To do so, core agent 404 may include any or all of the following components, in various embodiments:

1. An easy to use JMX MBean/Server interface which can be used to publish data created by a handler (e.g., metrics) as attributes and make them accessible to JMX consoles, such as JConsole.

2. A built-in, optional, 'light' HTTP Web Server which can be used for diagnostics.

Special adaptors can also be used to enable any Java™ agent to be loaded into core agent 404. For example, these adaptors may accept an unaltered javaagent jar, unpack them, and launch them in the context of other services (e.g., offered by the MT agent adapter factor). In addition, core agent 404 may leverage an instrumentation toolkit such as Javassist, or the like, to perform the bytecode injection (BCI) of instrumentation 408 into Java application 402.

In the context of Java 9+, core agent 404 may be implemented in a modularized fashion and may use an 'extension' class to the premain bootstrap process that would discover all of the JVM modules, as well as the modules for agent 404. The boot and premain sections have "unnamed" modules, and the agent loader section may be put into its own module called "AgentModule" or the like.

On bootstrap, a tweak is made to the "java.base" module that exports two packages required to complete the bootstrap. Immediately after that, any other required modules are loaded such as "java.sql," "jdk.httpserver," or the like. Note that these are not loaded by the JVM, by default. Then, the AgentModule of core agent 404 is created by loading all the .jars and packages in the Agent Loader of agent 404, which was created in premain. In turn, TenantModule(s) are created for each tenant 406 found by core agent 404.

To enable tenants 406 to instrument Java application 402, core agent 404 may perform the following:

Set the boot module (unnamed) to be able to read the AgentModule and TenantModules.

Set the AgentModule and TenantModules to export to the boot module (int boot Class Loader) Sets the premain module (unnamed) to be able to read the AgentModule and TenantModules.

Set the AgentModule and Tenant Modules to export to the premain module (e.g., in Application Class Loader).

Set ALL OTHER modules (e.g., non-agent) to export, to be read and be open to the AgentModule and Tenant Modules. In addition, ALL Tenant modules export to the Agent Module and also are open to the Tenant Module.

After startup, any new modules are reported during the Class Review (from new transforms) and are also set to export, be read, and be open to the Agent Module.

Startup of core agent 404 can be achieved either as a standalone Java™ agent, or via other pluggable adapters offered by the multi-tenant agent. For example, to launch core agent 404 as a standalone Java™ agent, the —javaagent switch can be added to the startup, similar to the following:

java—javaagent:prod/lib/javaagent.jar=agentConfig.yml

As noted, handlers of core agent 404 receive control during entry, exit, or exception events of a method. Also, instrumentation 408 by core agent 404 can be achieved in a number of ways. Likewise, a lightweight server (e.g., part of the JVM) can be loaded to process service requests for diagnostics or other reasons via agentConfig.yml.

Creation of a tenant 406 can be achieved by creating a named Tenant folder that includes the following subfolders:

config: this subfolder should include:
All handler property files (optional)
The tenant config file (called tenantConfig.yml) which specifies the instrumentation information lib: this folder should include the .jar files which should be included in the Tenant Class Loader For example, the following can be included in tenantConfig.yml to implement instrumentation for the tenant 406 that overrides the global guidance for that tenant:

tenant-specific-instrumentation-properties:
preloadClasses: // preload classes on startup
noTransformClass: agent.Java,com.singularity,com.appdynamics // don't transform these packages
noTransformLoaderClassName: JavassistAgentClassLoader,com.singularity,com.appdynamics // don't transform from these loaders
noTransformThreadName: // don't transform if this thread name Similarly, tenantConfig.yml may also specify the instrumentation specifics for that tenant 406 in terms of handlers. When specifying a custom entrycode or exitcode that will take place of the default entry/exit calls, it must have the proper Java™ syntax.

Any handler can also add a URL context, and will receive inbound messages to the JavaAgentServerInterface implementation, to the server using code similar to the following:
   JavaAgentServer server=JavaAgentServer.getInstance();
      server.addService(false, "/testhandler", this);

A handler can also have a properties file (handlername.properties) for configuration and must be located in the Tenant folder.

The embodiments described herein, therefore, provide for a multi-tenant Java agent instrumentation system. In particular, the description above introduces a multi-tenant core agent that can support multiple technologies in a single agent without conflict and without scaling issues. Further, the core agent allows for the use of scripted (e.g., not hard coded) instrumentation specific to a tenant/product, does not co-mingle instrumentation in the same class loader, and provides an easy mechanism to integrate multiple tenants within the same system.

—Enhanced Application Instrumentation Using Advanced ClassLoading—

As noted above, Java™ is used for many web applications, though certain features of Java™ still pose various issues to application stakeholders. For instance, as also noted above, many systems are still reliant on the Java Reflection System to make calls to any method for the purpose of modifying and/or accessing data, which impacts performance and code readability, and increases the amount of code and its complexity. This is especially true for instrumentation code, where Java™ agents are used to instrument software applications for security and/or performance monitoring purposes, and where the instrumentation in almost every case resorts to using Java reflection (e.g., due to the fact that they often do not have access to the application and the classes when they load the instrumentation class).

For example, when attempting to instrument Open Telemetry "spans", one may wish to instrument the creation or "start" of a span as well as the "end" of a span. This would require instrumenting the SpanBuilder class startSpan method, which may look like this in an application:
   Span span=Tracer.spanBuilder("name").startSpan ("main");
and then the Span class end method:
   span.end( );

However, because there may be multiple instances of the Span class from multiple class loaders, whatever Span class or Tracer class that had been intercepted would be treated as a completely different class than what was referenced. This is due to Java™ operation, where because they were from a different classloader than the corresponding instrumentation classloader—even though they had the same class name.

As such, it would be beneficial to directly cast an instrumented Span instance, and to add/set an attribute, like this:
   Span span=(Span)inst;
   span.setAttribute(key, value);
In reality, however, this is not possible—the cast would fail because the Span referred by "inst" would not be the same Span class being cast to it (it would have the Span class that came from the instrumentation class loader which does not delegate to the Application loader which would cause conflicts with the Instrumentation libraries). If the right span is not in the instrumentation, there will be a class cast exception. This means that to complete this task, conventional techniques have resorted to reflection, which may even require more permissions:
   Method m=inst.getClass( ).getDeclaredMethod("setAttribute",new Class[ ]{String,String});
   m.setAccessible(true);
   m.invoke(inst,new Object[ ]{key, value})

This reflection above is equivalent to the desired process above (directly casting an instrumented Span instance) in terms of what it does, but can be seen, it is poorly readable, and the "setAccessible" potentially requires a permission.

In general, the example above highlights only of the many issues faced when attempting to instrument applications. The only way to Refer directly to the Open Telemetry classes in the instrumentation would be for the Class being instrumented to be the exact same Class in the instrumentation which at first glance would seem impossible within the constraints of Java™. That is, it would basically mean any instance of the Class would be compiled as part of the instrumentation, but at runtime it would have to load the application's class(es) thru the instrumentation class loader. Generally, this has been seemingly impossible unless it specified the instrumented class's loader as the parent, which since you can only have one parent and in this case there are many loaders to deal with, this would mean conflicts in libraries between instrumentation and the Application.

Certain embodiments herein, therefore, may use an enhanced application instrumentation using advanced ClassLoading, providing an elegant way of directly accessing Java™ (or .NET) application classes from instrumentation without having to use reflection, thereby reducing the code complexity and size, while increasing readability and performance.

Operationally, the techniques herein may use the illustrative "Multi-Tenant Agent" describe above, where the multi-tenant agent is capable of supporting many "Tenants" (e.g., where a particular instrumentation application, such as a security application, is one of the "tenants" within the illustrative multi-tenant agent). Other techniques may be used herein, and the use of a multi-tenant agent as described above is merely one particular example used herein.

For reference, it is important to note that Class Loaders isolate and load classes, and that to load a class there are basically two ways:
   1) Reflection—a call that specifies the class name and the loader to obtain it from —Class.forName(name, init, Classloader);
   2) Direct—the class is loaded from a reference in the current class being referenced through the loader loading the original class (that is, a class is loaded and that class has a class loader that makes references to other classes, and then those other classes are loaded automatically through the original class that referred to that class loader).

Also, all Java™ runtimes have three class loaders automatically:
   1. Boot—loading bootstrap Java™ classes (core runtime classes);
   2. Extension—loading extension classes from libraries (libraries on top of the core runtime classes; and
   3. Application—loads the main Application classes (i.e., the Application itself).

Class Loaders, in general, have what's called "Delegation"—meaning when a class is to be loaded, essentially one of the following is performed:
   1. Ask a parent if they can load the class—called "parent first";
   2. Try to load the class, and if not—ask the parent—called "parent last".

By default—the Application loader parent is Extension loader and the Extension loader parent is the Boot. So for example, whenever a request is made in the application in "parent first", it actually goes all the way downstream to the boot, and if that class is not available, then the application will try itself. Notably, most web applications today essentially have their own Class Loaders and delegate to the Application Loader.

Traditional Class Loading for Applications requires a higher level of class loading understanding and complexity to accomplish complex Java instrumentation on those Applications. For instance, if instrumentation needs to delegate to multiple locations, this is currently unachievable since there can only be one parent.

According to one or more embodiments herein, therefore, "Proxy" and "Delegate" instrumentation modules (e.g., called Handlers, Interceptors, etc.) may be built.

As shown in FIG. 5, the Proxy instrumentation is specified via the "proxy:" attribute in the instrumentation handler (only one exists for the Agent), e.g., in the following example tag 505:

proxy: true
handler: com.cisco.mtagent.instrumentation.Instrument—
ationClassLoadingProxyInter nalHandler
active: true The Delegate instrumentation, on the other hand, is specified via the "delegate:" attribute in the instrumentation (there are no limits on the number of delegates), as shown in the example tag 515:

class: io.opentelemetry.api.trace.SpanBuilder
is method: startSpan
handler: com.cisco.argento.methodhandlers.OTDelegate-
MethodHandler
catch: true
delegate: true
load-from: argento-tenant.jar According to embodiments herein, these are a front-end for the delegation. For instance, the proxy performs an interception, and then it builds a delegate on-demand, putting everything in place so that the delegate can actually delegate to the original application class (or multiple classes, if need be). Through this, the embodiments herein thus provide access to the real application class.

Specifically, the Proxy, when applied to the Application implementation (e.g., the method is what would be called from the instrumented method, such as startSpan creating a span)—may look something like the code 605 of FIG. 6 (also shown below), where this static call (e.g., to the instrumentation) would be inserted into this span builder class:

public Span startSpan(String name) {
    com.cisco.mtagent.boot.instrumentation.MethodEntry-
        AndExit.methodEntryControl( . . . )
}

The delegate has specified what to be instrumented, however—it is the Proxy instrumentation that will be instrumented into the Application class. For instance, in the Proxy instrumentation Class, control would be passed here AFTER startSpan has been called, but BEFORE it's been executed. At this point, the techniques herein look to see if a Delegate class exists yet that can handle and process this request.

Essentially a Delegate would be built when an application class is detected (in this case SpanBuilder) for each instrumentation module (called a handler) and for each Class-Loader—this is done in the Proxy instrumentation handler-Entry—when startSpan is called in the SpanBuilder. New delegates are then cached and then called to process the startSpan methods WITH DIRECT ACCESS to the Application's SpanBuilder class regardless of where it was loaded from. An example of this code is seen in code 615, and below:

```
public void handlerEntry(Object inst, Object[ ] args, String className, String
method, String signature, String ruleIdString) {
    // Get All RuleIds represented in this intercept call
    String[ ] ruleIds =
ruleIdString.split(InstrumentMethod.RULE_ARG_SEPARATOR);
    for (String id : ruleIds) {
        // Get Delegate for this Rule ID + ClassLoader
        DelegateMethodHandlerInfo = delegateMethodHandlerInfoMap.get(id);
        // Need Delegate loaded - 1 Per Handler Name, and Per ClassLoader - do
they exist?
        for (String handler : delegateMethodHandlerInfo.handlerNames) {
            String key = handler + ":" + controller.getLoaderObjectString(inst);
            MethodHandler delegateMethodHandler =
delegateMethodHandlerHash.get(key);
            if (delegateMethodHandler == null) {
                delegateMethodHandler =
createDelegateMethodHandlerAtRuntime(delegateMethodHandlerInfo, handler, inst);
                delegateMethodHandlerHash.put(key, delegateMethodHandler);
            }
            delegateMethodHandler.handlerEntry(inst, args, className, method,
signature, id);
        }
    }
}
```

In particular, the code 615 above looks to determine information such as the class owner itself, and also an ID which specifies with the groups of handlers for that class. The code then creates a key out of that, and then determines delegation information that would be inserted, which is where the techniques herein would be able to create a delegated runtime. If the delegate was not created, then the code would create it. Otherwise, if the delegate was already created, then the code would not need to recreate it. In either event, the code above calls the delegate handler, and calls its handler into it.

Notably, since this is a proxy, one cannot refer directly to any application classes here, because there isn't any delegation (the right class would not be hit). However, here, the real class may be proxied into, in which case, the techniques herein would be able to directly access the class, accordingly.

According to the embodiments herein, creating and setting up the delegate may be based on a number of steps.

First, the actual Delegate class is "cloned" using the class name specified in the "handler:" attribute, and the "load-from:" attribute to specify where to find the class bytes. That is, since the delegate class is not an actual class yet, but it's a clone from a class, being specified in a handler attribute (e.g., and may be loaded from a.jar file specified in the load-from attribute).

Second, the class bytes are read (cloned) and then "renamed" with a unique class name (to avoid naming collisions). Essentially, the class bytes are brought in, and there's somewhat of a class structure, but it's not a real java class. This class structure may be created using something like Javassist (and then it's renamed so that it has a unique class name to avoid any naming collisions).

Third, a Class Loader is created for the Delegate which would specify the Proxy Class Loader as the parent (to delegate to). This is performed because there are classes in the proxy Class Loader that need to be delegated that support the instrumentation (which is how the illustrative multi-tenant agent works—a tenant whose parent is a tenant).

Fourth, required "delegation(s)" are added to the Application Class Loader, such as by using this method—addDelegateLoader(ClassLoader deletegateLoader). This step is particularly important, as in this Class Loader, there is the ability to specify delegates (Class Loaders to delegate to), but unlike the parent specifying the parent (where only one parent is allowed), the techniques herein can now specify as many as wanted, for whatever it is that is to be done. That is, in order for instrumentation to access whatever is needed, these delegates are added to the application ClassLoader.

And fifth, the techniques herein create the Delegate class in the Delegate Class Loader. For instance, since the class doesn't exist yet (because until the Class Loader has loaded the class, it would crash upon not finding the application Class Loaders), creating the Delegate class in the delegate Class Loader will automatically delegate to the right application loader, accordingly.

FIGS. 7A-7B show example code 700 (in Proxy) to create the Delegate Loader, add Application Class Delegation, and Create the Class. That is, code 700 (also included below) shows how the steps above create the delegate loader itself.

```
public MethodHandler
createDelegateMethodHandlerAtRuntime(DelegateMethodHandlerInfo
delegateMethodHandlerInfo, String handler, Object inst) {
    try {
        delegateId++;
        int index = handler.lastIndexOf(".");
        String newDelegateTenantName = handler.substring(index + 1) + "-delegate-" + delegateId;
        String newDelegateMethodHandlerName = handler + "-delegate-" + delegateId;
        ClassLoader hisLoader = inst.getClass( ).getClassLoader( );
        TenantRegistry = AgentPicoContainer.getInstance(TenantRegistry.class);
        AgentTenant delegateAgentTenant = tenantRegistry.createDelegateTenant(newDelegateTenantName, delegateMethodHandlerInfo.agentTenant);
        TenantClassLoader newDelegateTenantLoader = (TenantClassLoader) delegateAgentTenant.getLoader( );
        // Get the Delegate Method Handler bytes
        byte[ ] bytes = getDelegateMethodHandlerBytes(handler, delegateMethodHandlerInfo.agentTenant.getLibDir( ) + File.separator + delegateMethodHandlerInfo.loadJar, newDelegateMethodHandlerName);
        // TODO: Add to Tenant Loader to Delegate to the instrumented classes loader - delegate us first
        if (inst != null && hisLoader != null) {
            newDelegateTenantLoader.addDelegateLoader(hisLoader);
        }
        // Create the Class
        newDelegateTenantLoader.defineClass(newDelegateMethodHandlerName, bytes);
        // Verify class creation
        Class clazz = Class.forName(newDelegateMethodHandlerName, true, newDelegateTenantLoader);
        // Cast to MethodHandler
        MethodHandler delegateMethodHandler = (MethodHandler) clazz.newInstance( );
        // Initialize it
        delegateMethodHandler.initHandler(newDelegateMethodHandlerName, this.agentHome, this.agentArgs, this.instrumentation);
        logger.log("Created Delegate Method Handler in Tenant Class Loader " + newDelegateTenantLoader);
        return delegateMethodHandler;
    } catch (Throwable t) {
        logger.logWarning(false, "Could not create delegate at runtime " + logger.getStackTrace(t));
        return null;
    }
}
```

FIG. 8 illustrates example code 800 (in the Delegate Class Loader) to add the "delegation" to Application Class Loader (s) so the techniques herein can directly access the SAME class as the Application. The code is also included below:

```
// We will pull Classes from these loaders
public void addDelegateLoader(ClassLoader deletegateLoader) {
    if (delegateToLoaders == null) {
        delegateToLoaders = new HashSet<>( );
    }
    delegateToLoaders.add(deletegateLoader);
}
@Override
protected Class<?> loadClass(String name, boolean resolve) throws
ClassNotFoundException {
    Class<?> loadedClass = null;
    // List of delegate loaders - we load from them first
    if (delegateToLoaders != null &&
!name.startsWith(MT_AGENT_PACKAGE_PREFIX)) {
        try {
            for (ClassLoader : delegateToLoaders) {
                loadedClass = classLoader.loadClass(name);
            }
        } catch (Exception e) {
        }
    }
    // has the class loaded already?
    if (loadedClass == null) {
        loadedClass = super.loadClass(name, resolve);
    }
    return loadedClass;
}
```

As can be seen above, the embodiments herein are adding a list of loaders, such that whenever the application loads the delegate class, any class that it refers to is going to end up calling this load class. Notably, this process may be hidden from plain view, but when it occurs, the loaded class itself is either going to delegate (it can call), or it can try to load the class itself. In this case, such as in the example above which is configured to delegate to the parent (or to the class that was extended, which is going to delegate to the parent), the code above gets executed first, and determines whether this is a multi-tenant agent class, and if not, then it would know that it needs to check and see if the proxy set up the delegates (e.g., trying each delegate that the proxy set up to see). As such, the code will end up loading/getting the right class from the right place, essentially because the proxy set it up appropriately.

In closing, therefore, when the actual Delegate class is loaded, its class loader will first try to load from all the "delegated" Application Class Loaders and will load the class from there, which will be the same exact class as what the instrumentation needs. This implies that the embodiments herein may provide code similar to what the actual application is using to add attributes, events, etc., such as:
    Span span=(Span)inst;
    span.setAttribute(key, value);

In other words, with the embodiments above being implemented during application instrumentation, then the instrumentation can refer to as many application classes as desired.

—OpenTelemetry™—

As noted above, OpenTelemetry™ represents a massive shift from proprietary application monitoring systems, such as application performance monitoring (APM) solutions, to an infrastructure that leverages application programming interfaces (APIs) that are standardized and open. OpenTelemetry™ is also quickly becoming an important cornerstone of the Cloud Native Computing Foundation.

In general, OpenTelemetry™ is the merging of OpenTracing and OpenCensus, which are two different open source standards projects which conflicted with each other. Essentially, the 'merged' technology of OpenTelemetry™ is focused on 'Cloud Native Computing' environments and is now part of the Cloud Native Computing Foundation (CNCF). OpenTelemetry™ represents a huge paradigm shift for Application Monitoring and specifically Application Tracing. By far the most popular and heavily supported platform for OpenTelemetry™ is Java™.

To better illustrate the teachings herein, the following terminology is used:
    Trace: a record of activity for a request through a distributed system. A trace is often represented as a Directed Acyclic Graph (DAG) of spans.
    Spans: named, timed operations representing a single operation within a trace (e.g., a piece of the workflow). Spans can be nested to form a trace tree. Each trace contains a root span, which typically describes the end-to-end latency and (optionally) one or more sub-spans for its sub-operations. Spans also accept key: value tags as well as fine-grained, timestamped, structured logs attached to a particular span instance.
    Metrics: a raw measurement about a service that are captured at runtime. OpenTelemetry™ defines three metric instruments: counter, measure, and observer. An observer supports an asynchronous API collecting metric data on-demand, once per collection interval.
    Span Context: a span includes a span context, which is a set of globally unique identifiers that represent the unique request to which each span belongs, representing the data required for moving trace information across service boundaries. Said differently, a span context includes trace information that accompanies a distributed transaction, including when it passes the service to service over the network or through a message bus. Typically, a span context includes the trace identifier, span identifier, and any other data that the tracing system needs to propagate to the downstream service. OpenTelemetry™ also supports the correlation context which can carry any user-defined properties. A correlation context is not required, and components may choose not to carry or store this information.
    Context Propagation: the means by which context is bundled and transferred between services, typically via HTTP headers. Context propagation is a key part of the OpenTelemetry™ system, and has some interesting use cases beyond tracing, such as for A/B testing. Note that OpenTelemetry™ Supports multiple protocols for context propagation and to avoid issues, it is important that a single method be used throughout an application. So, for instance, if the W3C specification is used in one service, it should be used throughout the complete system. These are the currently supported options:
        W3C Trace-Context HTTP Propagator
        W3C Correlation-Context HTTP Propagator
        B3 Zipkin HTTP Propagator FIG. 9 illustrates an example of a distributed transaction 900, according to various embodiments. As shown, assume that distributed transaction 900 begins at a first service, Service A, and is handed off via a network call to a second service, Service B, as time progresses. In such a case, tracing distributed transaction 900 using OpenTelemetry™ will result in a parent span for the execution of distributed transaction 900 by Service A that spans several child spans. In addition, the network call to pass distributed transaction 900 to Service B will also result in a span context. This allows the tracing of distributed transaction 900 to continue as a child span of the parent span that began at Service A.

OpenTelemetry™ is generally focused on application performance and not on security. More specifically, OpenTelemetry™ seeks to merge the tracing, metrics, and logging functions from OpenTracing and OpenCensus into a single, cohesive package under the CNCF. In this context, (distributed) tracing provides insight into the full lifecycles (e.g., traces) of requests to the system, allowing failures and performance issues to be identified. Metrics provide quantitative information regarding executed processes of the system, such as gauges, histograms, and counters. Logging, in turn, provides insight into messages sent by processes that are application-specific. These three functions are also often interrelated. For instance, a subset of misbehaving traces can be identified by looking at metrics. Similarly, analysis of the logs can reveal the root cause of the behavior. New metrics can also be introduced to identify the issue earlier in time.

—Advanced Agent Instrumentation for Open Telemetry Implementations—

As also noted above, OpenTelemetry™ implementations can be shared by all applications or could be specific to a single application. Notably, the instrumentation of OpenTelemetry™ APIs not only requires the ability to find the implementations, but also that the correct Class can be loaded in the correct implementation so that the instrumentation can actually use the classes. Current instrumentation techniques, however, have not yet managed to keep up with the complexities of instrumenting OpenTelemetry™.

By instrumenting OTEL APIs, in particular, it would be possible to achieve the following:

Find all the active Tracers (there can be multiple tracers servicing both manual and automatic instrumentation);
Locate the OTEL versions;
Determine the current Span and Trace ID for the current transaction (from the Span Context);
Add additional information such as Application Correlation, Events, etc. to the existing OTEL pipeline (piggyback);
Manage the OTEL framework inside the runtime;
Etc.

Essentially, by instrumenting OTEL APIs, additional enhancements the OTEL experience may be created, particularly building bridges between OTEL and other systems—all while using the APIs and software developer kits (SDKs) that are already in the runtime.

However, there are real challenges to being able to directly reference the correct APIs and Implementation classes—as well as finding this information. It requires a Classloading and delegation system that is custom tailored to deal with the OTEL environment while at the same time being eco-friendly as most of the applications that will be instrumented would be "small footprint" microservices (versus monolithic) that have limited resources.

The techniques herein, therefore, are designed to provide an elegant solution to a difficult problem.

As another primer on Classloading, Classes are loaded by ClassLoaders —ClassLoaders can have parent ClassLoaders (only one) and generally delegate to the parent to find/load a class before attempting to load it locally. This creates a recursive search for a class to be loaded all the way down the delegation chain. By default for a simple JVM—the chain looks like this:

SystemApplicationLoaderExtension/Platform Loader-BootLoader

As such, a call to the ApplicationLoader will trigger load requests all the way to the BootLoader, and if not found, the ApplicationLoader will be initiated. When there are Applications loaded—they generally will have their own loader and it will look like this:

ApplicationLoaderSystemApplicationLoader→Extension/Platform LoaderBootLoader

Again, a call to the ApplicationLoader will trigger load requests all the way to the BootLoader, and if not found, the ApplicationLoader will be initiated.

Moreover, Classes are considered different if they come from different Class Loaders and will cause ClassCastExceptions. Therefore, if an ApplicationLoader loaded a class locally (it did not delegate to parent SystemApplicationLoader—called "child first") but then somehow got an instance of that same class which was found in the SystemApplicationLoader—this would cause an Exception. As an example:

Span span=Span.currentSpan( ).

Span is loaded from a local loader but is now being set to a Span loaded from another loader. In just this example, one can see the Complexity of Classloading—which is even further complicated with a Java 9+ module system on top of it.

Regarding OpenTelemetry™ specifically, and as an OpenTelemetry™ API/SDK primer, the OTEL API is simply an interface—it defines the Classes and Method interfaces that defines the capability. The OTEL SDK, on the other hand, is simply an out of band implementation for the interface for convenience (and must subscribe 100% to the OTEL API). Any third party vend( )r can extend the SDK and/or implement the API as long as they do not alter the underlying functionality outside of the OTEL specifications.

A typical OTEL runtime can be a mix of both manually instrumented SDK/APIs or in the case of the OTEL Java Agent—it contains an API/SDK which is "automatically" injected into the Runtime using instrumentation (e.g., OpenTelemetry™ Java Instrumentation). In most cases, however, the focus is on the "trace" API (part of the overall API).

As an example of code to create and end a span, the following code may be found within an application:

Create a Tracer;
Create and starts a Span;
Make that the current Span;
Add Start Event to Span;
Add End Event to Span;

FIG. 10 illustrates a more specific example of code 1000 to create and end a span, which also follows below:

```
class MyClass {
  private static final Tracer tracer =
    openTelemetry.getTracer("instrumentation-library-name", "1.0.0");
  void do Work( ) {
    Span span = tracer.spanBuilder("MyClass.DoWork").startSpan( );
    try (Scope ignored = span.makeCurrent( )) {
      Span.current( ).addEvent("Starting the work.");
      doWorkInternal( );
      Span.current( ).addEvent("Finished working.");
    } finally {
      span.end( );
    }
  }
}
```

Now, to illustrate various use cases/examples of issues involved with instrumenting OpenTelemetry™ implementations, it is important to note that a typical Java™ Agent will have classes in the boot loader, the main Agent entry in the SystemApplicationLoader, and then an isolated loader which normally the parent is the Boot Loader (or Platform for Java 9+). The Agent is designed to not conflict with the Application in any way—so any dependencies the agent uses will be in the isolated loader.

Taking a look at the Application and the Instrumentation delegation chains, it is clear that they would never share the same class:

Application: ApplicationLoaderSystemApplicationLoader→
Extension/Platform LoaderBootLoader
Agent: AgentLoaderBootLoader So, if the Agent intercepts a class loaded in the Application Loader, then the Agent Loader does not have it (because ApplicationLoader is not in the delegation chain). As such, the Agent will have no choice but to do a Reflection which does not require the Class to be available at load time. But this also adds complexity and is not as straightforward as just coding it up:

Example 1: Assume in the instrumentation one wanted to get the current span, perhaps to add some sort of event to the current span from the instrumentation intercepting this class:
Span currentSpan=Span.currentSpan( )

The Span class here will not return the current span UNLESS that Span class IS from the Application Classloader—and the ONLY way that will happen is to have an intelligent way of delegating "on the fly" to the Application Classloader with the correct OpenTelemetry™ implementation during instrumentation time.

Example 2: This time assume a desire to instrument all Spans that are being terminated—and to add an Event from a third party product. Here, one would instrument the Span class and would instrument the "end" method and "cast" it to the Span instrumented instance as such:
is Span currentSpan=(Span) instance;
currentSpan.addEvent("The event is ending . . . the span had 0 security issues . . . ")

This results in the same problem as Example 1, namely that the cast will generate a ClassCastException UNLESS the Span Class is the same that can be "seen" from the instrumented class.

Example 3: Assume one wants to get the Global Tracer— so they instrument a class with following instructions:
Tracer tracer=OpenTelemetry.getGlobalTracer( )

This is to fail as well. If OpenTelemetry™ was a delegated class and it passed a Tracer class from the registry and the programmer had not totally delegated ALL Open Telemetry classes in the API and SDK—and specified the Tracer in an import—then the Tracer is not the same as the Tracer passed back and there will be a ClassCastException.

The techniques herein, therefore, are directed to advanced agent instrumentation for providing enhancements and management of OpenTelemetry™ implementations. That is, the techniques herein provide a special Advanced Class Loading system that can not only instrument classes but also knows how to delegate the loading of the classes doing the instrumentation to find classes (delegate) containing the correct OTEL API and SDK classes and load them with the instrumentation classes at load time, which is when the actual instrumentation takes place. Notably, the techniques herein are "OpenTelemetry Aware" and are capable of not confusing multiple versions, tracers, vend( )rs, etc.

As mentioned above, the techniques herein may use the illustrative "Multi-Tenant Agent" describe above, where the multi-tenant agent is capable of supporting many "Tenants". Other techniques may be used herein, and the use of a multi-tenant agent as described above is merely one particular example used herein.

Operationally, the solution herein starts with a "Proxy Tenant" and "x" number "Implementation Tenants" (to be allocated for each Loader encountered).

The Proxy Tenant has a handler that does initial interception of the OTEL API/SDK.

Implementation Tenants have NO instrumentation—but create the Implementation Tenant loaders (with no classes).

An Implementation Map is created to map Loaders to Implementation Tenants that will be populated when discovered, as described below.

Here, each discovered loader maps to a dynamically loaded handler delegating to it:
private final Map<ClassLoader, ImplementationClass> implementationAllocationMap=new ConcurrentHashMap< >( );

Also, multiple tenants may be loaded by creating tenant folders and setting the tenantConfig.yml to have no instrumentation (it will be added dynamically).

Proxy initialization will create the Implementation Handlers (one for each Loader) which will actually intercept calls and use direct OTEL Class/Method Calls. That is, the techniques herein:

Load the real handler bytes which will eventually make the direct OTEL calls from a jar file into a Javassist class (not a Java Class);
Rename that Javassist class to match an Implementation Tenant; and
After renaming the Javassist class, get and save the new bytes and associate them with the Implementation Tenant.

FIGS. 11A-11B illustrate example code 1100 (1100a and 1100b, respectively) to create implementation class bytes (but not classes yet) that are to be allocated upon discovery of new OTEL implementations. Namely, in code 1100a:
// Create opentelemetryextension-impl-1, opentelemetryextension-impl-2, etc.
for (int i=0; i<implementationsHandled; i++) {
String name=TENANT_IMPLEMENTATIONS_PREFIX+(i+1);
// Wrapper class for the implementation—Current Tenant loaders have no handlers
ImplementationClass implementationClass=new ImplementationClass(name, (TenantClassLoader)mtAgentTenantAPI.getTenantLoader
(name));
implementationHash.put(name, implementationClass);
implementationList.add(implementationClass);
// Load bytes for OpenTelemetryExtensionMethodHandlerReal.class—and then rename to match Tenant loaders: opentelemetryextensionimpl—
1, opentelemetryextension-impl-2, etc.
byte[ ] bytes=getImplementationMethodHandlerBytes (BASE_CLASS_TO_CLONE, name);
// Save the bytes until implementation time
implementationClass.bytes=bytes;
mtAgentTenantAPL.log("Initializing Implementation "+implementationClass.name+", loader: "+implementationClass.tenantClassLoader+", bytes: "+implementationClass.bytes);
}

And then in code 1100*b*:

```
public byte[ ] getImplementationMethodHandlerBytes
    (String baseHandler, String className) throws Exception {
try {
ClassUtils    classUtils=AgentPicoContainer.getInstance
    (ClassUtils.class);
// I have 1 jar in implementation Tenant Loader which is
    the handler
URL myURL=tenantLoader.getURLs( )[0];
File jarf=Paths.get(myURL.toURI( )).toFile( );
// Get raw bytes for the Implementation Class from jar
byte[ ] bytes=classUtils.getClassBytesFromJar(jarf.getAbsolutePatho, baseHandler);
// Make a CtClass—this is NOT a real Java Class yet
ClassPool cp=ClassPool.getDefaulto;
CtClass ctClass=cp.makeClass(new java.io.ByteArrayInputStream(bytes));
// Rename it
String name=PACKAGE_NAME+"."+className;
ctClass.setName(name);
// Get bytes for renamed class
bytes=ctClass.toBytecodeo;
return bytes;
}catch (Throwable t) {
mtAgentTenantAPL.logWarning("Error initting implementation Method Hander . . . ");
return null;
}
}
```

Now, for runtime allocation of implementation handlers/tenants to discovered loaders, the techniques herein may illustratively operate as follows:

Proxy Tenant Handler receives call from OTEL API/SDK intercept for Method Entry;
Implementation Map is checked to see if an Implementation Tenant is allocated for that Loader;
If NO:
  Allocate an Implementation Tenant from available Implementation Tenants;
  Update Map with Loader key pointing to the Implementation Tenant;
  Set the Implementation Tenant Class Loader to delegate from the OTEL Loader just discovered;
  Get the associated Implementation Tenant Class Loader and bytes for the Implementation Handler;
  Call Tenant Class Loader method defineClass with the new bytes; and
  Verify new Implementation Handler class loaded in Implementation Tenant Class Loader; and
Call the Implementation Tenant Method Entry to do the "real work"—it will be able to directly load OTEL classes and any classes they load.

FIGS. 12A-12C illustrate further example code 1200 (1200*a*, 1200*b*, and 1200*c*, respectively) for runtime allocation of implementation handlers/tenants to discovered loaders as described herein. Namely, in 1200*a*:

```
public void handlerEntry(Object inst, Object[ ] args,
    String className, String method, String signature,
    String id) {
ClassLoader
    implLoader=inst.getClasso.getClassLoadero;
// Do we have implementation Handler for this Loader? If
    not—get one
ImplementationClass
    implementationClass=implementationAllocationMap.get
    (implLoader);
if (implementationClass==null) {
// Allocate Implementation
implementationClass=allocateImplementation(inst, implLoader);
mtAgentTenantAPL.log("Allocating new Implementation Class "+implementationClass.name+" to handle loader "+implLoader);
}
mtAgentTenantAPL.log("Calling implementation handler "+implementationClass.name+" to handle loader "+implLoader);
// Call the Implementation Handler
implementationClass.tenantMethodHandler.handlerEntry
    (inst, args, className, method, signature, id);
```

And then in code 1200*b*:

```
private synchronized ImplementationClass allocateImplementation(Object inst, ClassLoader implLoader) {
try {
// We have max allocated Implementations
if (implementationsInUse==implementationsHandled) {
throw new Exception("Maximum implementations are reached . . . can't monitor any more implementation . . . ");
}
// Get one if available
ImplementationClass
    implementationClass=implementationList.get(implementationsInUse);
implementationsInUse++;
// Add to Tenant Loader to Delegate to this loader
implementationClass.tenantClassLoader.addDelegateLoader(implLoader);
// Create the Implementation Tenant Handler on the fly
implementationClass.tenantMethodHandler=createImplementationClassAndHandler(implementationClass);
mtAgentTenantAPL.log("Allocating implementation Method Handler "+implementationClass.tenantMethodHandler+" to handle implementation found in Class Loader "+implLoader);
// Mark this as Allocated to this loader
implementationAllocationMap.put(implLoader, implementationClass);
return implementationClass;
is}catch (Exception e) {
mtAgentTenantAPL.logError("Exception creating real handler: "+e);
return null;
}
}
```

And now in code 1200*c*:

```
private TenantMethodHandler createImplementationClassAndHandler(ImplementationClass implementationClass) throws Exception
{
try {
// Set the Implementation Tenant Loader class name
String className=PACKAGE_NAME+"."+implementationClass.name;
// Load bytes directly into TenantclassLoader
implementationClass.tenantClassLoader.defineClass
    (className, implementationClass.bytes);
// Verify class creation
Class clazz=Class.forName(className, true, implementationClass.tenantClassLoader);
// Cast to TenantMethodHandler
TenantMethodHandler implementationMethodHandler=
    (TenantMethodHandler) clazz.newInstance( );
```

```
// Initialize it
implementationMethodHandler.initHandler(implementa-
    tionClass.name, this.agentHome, this.agentArgs, thi-
    s.instrumentation);
mtAgentTenantAPL.log("Created implementation han-
    dler "+implementationMethodHandler+" into Class-
    loader "+
implementationMethodHandler.getClasso.getClassLoad-
    erO);
is return implementationMethodHandler;
}
catch(Throwable t) {
mtAgentTenantAPL.log("Error: "+t);
return null;
}
}
```

FIG. 13 illustrates an example of a code 1300 to add a "Delegation Loader" to an existing class loader according to the techniques herein. Namely:

```
// We will pull Classes from these loaders
public void addDelegateLoader(ClassLoader deletegate-
    Loader) {
if (delegateToLoaders==null) {
delegateToLoaders=new HashSet< >( );
}
delegateToLoaders.add(deletegateLoader);
}
@Override
protected Class<?>loadClass(String name, boolean
    resolve) throws ClassNotFoundException {
Class<?>loadedClass=null;
if (delegateToLoaders !=null && !name.startsWith
    (MT_AGENT_PACKAGE_PREFIX)) {
try {
for (ClassLoader classLoader: delegateToLoaders) {
loadedClass=classLoader.loadClass(name);
}
}catch (Exception e) {
}
is}
// has the class loaded already?
if (loadedClass==null) {
loadedClass=super.loadClass(name, resolve);
}
return loadedClass;
}
public void defineClass(String className, byte[ ] bytes)
    {
super.defineClass(className, bytes, 0, bytes.length);
}
```

Figure 14:
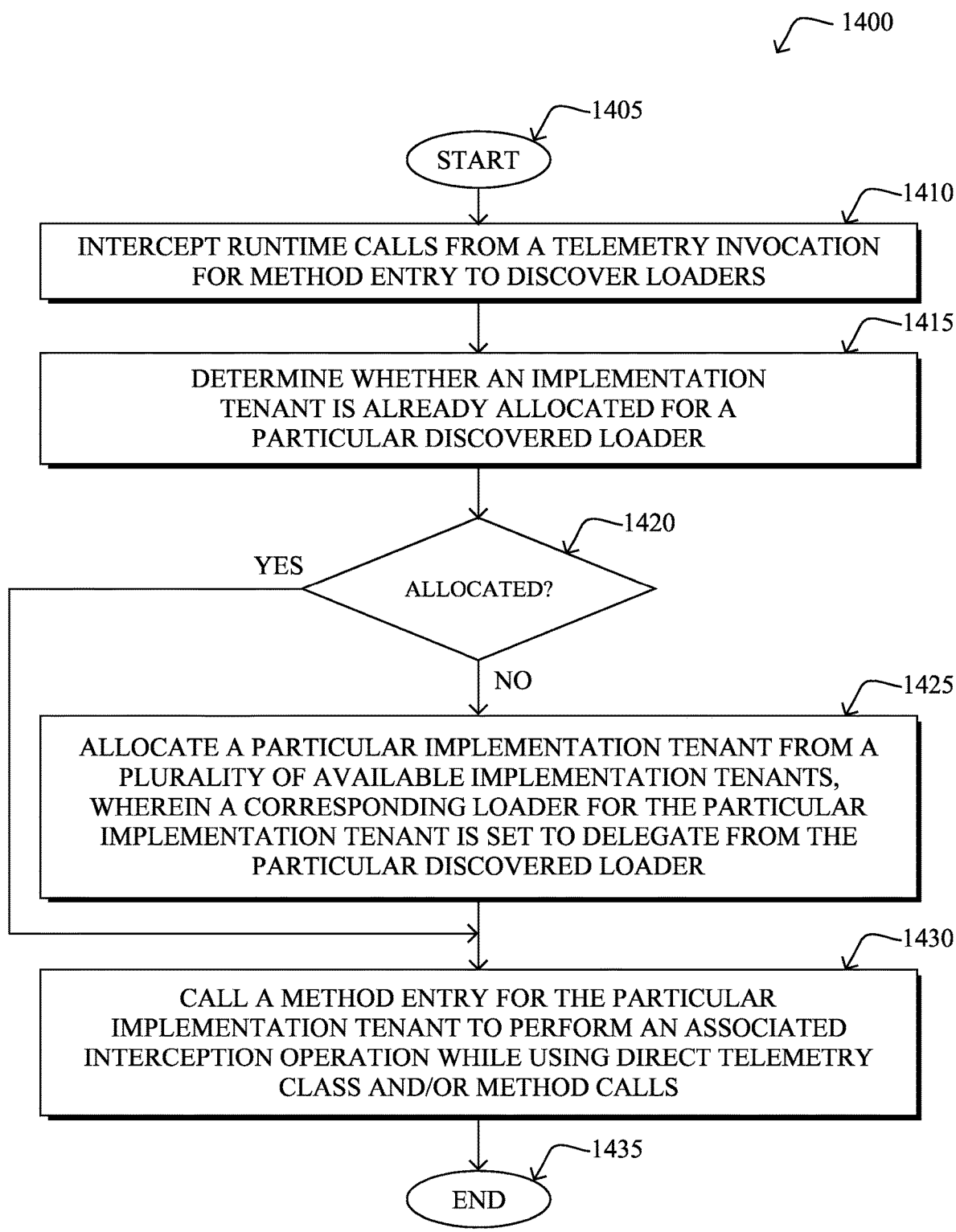
FIG. 14 illustrates an example simplified procedure for advanced agent instrumentation for providing enhancements and management of OpenTelemetry implementations in accordance with one or more embodiments described herein.

In closing, FIG. 14 illustrates an example simplified procedure 1400 for advanced agent instrumentation for providing enhancements and management of OpenTelemetry™ implementations in accordance with one or more embodiments described herein. For example, a non-generic, specifically configured device (e.g., device 200) may perform procedure 1400 by executing stored instructions (e.g., process 248, such as a proxy tenant handler). The procedure 1400 may start at step 1405, and continues to step 1410, where, as described in greater detail above, the techniques herein intercept runtime calls from a telemetry invocation (e.g., OpenTelemetry™ API/SDK) for method entry to discover loaders.

In step 1415, the techniques herein may then determine whether an implementation tenant is already allocated for a particular discovered loader. For example, as described above, determining whether an implementation tenant is already allocated for the particular discovered loader may be based on checking an implementation map that maps discovered loaders to implementation tenants.

Notably, as described above, the techniques herein may create a plurality of available implementation tenants (which have no instrumentation) during a proxy initialization for the telemetry invocation. For example, this may involve loading specific handler bytes that will make direct telemetry calls from a jar file into a javassist class, renaming the javassist class to match a specific implementation tenant, and associating the specific handler bytes with the specific implementation tenant, as detailed above. Note also that as mentioned above, multiple tenants may be loaded by creating corresponding tenant folders and setting a corresponding configuration to have no instrumentation.

Returning to procedure 1400, if in step 1420 it is determined that no implementation tenant is already allocated for the particular discovered loader, then in step 1415 the techniques herein allocate a particular implementation tenant from a plurality of available implementation tenants (e.g., and update an implementation map with a loader key pointing to the particular implementation tenant), where a corresponding loader for the particular implementation tenant is set to delegate from the particular discovered loader. Note that in in one embodiment, the techniques herein may also determine, for the particular implementation tenant, an associated tenant class loader and associated handler bytes, and may call, for the associated tenant class loader, a method defineClass with the associated handler bytes. Also, in one embodiment, the techniques herein may verify a class loaded in a class loader of the particular implementation tenant, as described above.

In step 1430, either in response to the particular implementation tenant being allocated or being already allocated for the particular discovered loader, the techniques herein may then call a method entry for the particular implementation tenant to perform an associated interception operation (e.g., instrumenting telemetry calls) while using direct telemetry class and/or method calls (for example, loading telemetry classes and any classes loaded by the telemetry classes).

The simplified procedure 1400 may then end in step 1435, notably with the ability to continue intercepting/discovering loaders and associating the discovered loaders to implementation tenants, accordingly. Other steps may also be included generally within procedure 1400. For example, such steps (or, more generally, such additions to steps already specifically illustrated above), may include other techniques and/or other specific embodiments as described herein.

It should be noted that while certain steps within procedure 1400 may be optional as described above, the steps shown in FIG. 14 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for advanced agent instrumentation for providing enhancements and management of OpenTelemetry™ implementations. In particular, the techniques herein are an elegant, minimally invasive, and easy to use methodology for security and/or performance instrumentation. This is especially true when trying to instrument OpenTelemetry™ instances (there can be multiple) where it us unknown at runtime how many instances there are or where they are in the application, as the embodiments herein allow for instrumentation to be created on-demand for discovered instances (e.g., every instance). Accordingly, many different products, such as performance monitoring, security, OpenTelemetry™, and so on, can take advantage of the techniques herein, using instrumentation that is more readable, more efficient, and more effective.

Although not often thought about—there are good reasons for companies who want to "enhance" and "manage" OpenTelemetry™ implementations in the customer environment. It requires the ability to discover and apply instrumentation to the OpenTelemetry™ system to do this—and given the complexity of that system—and the complexity of the Java Runtime (especially with the Java 9+ Module System—JPMS) and the fast moving ecosystem of Cloud Native Kubernetes Clusters/Pods and "On Demand" scalability—the bar is high to devise an agent system capable of instrumenting this in a manner that is safe, effective, seamless, transparent, optimal, and scales to the demands of OpenTelemetry™. The techniques herein, therefore, provide such a solution to the above, and provide a foundation for building full-stack observability (FSO) enhancements inside the application runtime moving forward.

Illustratively, the techniques described herein may be performed by hardware, software, and/or firmware, such as in accordance with the illustrative application instrumentation process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: intercepting, by a process, runtime calls from a telemetry invocation for method entry to discover loaders; determining, by the process, whether an implementation tenant is already allocated for a particular discovered loader; allocating, by the process and in response to no implementation tenant being already allocated for the particular discovered loader, a particular implementation tenant from a plurality of available implementation tenants, wherein a corresponding loader for the particular implementation tenant is set to delegate from the particular discovered loader; and calling, by the process in response to the particular implementation tenant being allocated or being already allocated for the particular discovered loader, a method entry for the particular implementation tenant to perform an associated interception operation while using direct telemetry class and/or method calls.

In one embodiment, the method further comprises: creating the plurality of available implementation tenants during a proxy initialization for the telemetry invocation. In one embodiment, creating the plurality of available implementation tenants comprises: loading specific handler bytes that will make direct telemetry calls from a jar file into a javassist class; renaming the javassist class to match a specific implementation tenant; and associating the specific handler bytes with the specific implementation tenant.

In one embodiment, allocating the particular implementation tenant comprises: determining, for the particular implementation tenant, an associated tenant class loader and associated handler bytes; and calling, for the associated tenant class loader, a method defineClass with the associated handler bytes.

In one embodiment, the telemetry invocation is based on OpenTelemetry™.

In one embodiment, the associated interception operation comprises instrumenting telemetry calls.

In one embodiment, the process comprises a proxy tenant handler.

In one embodiment, determining whether an implementation tenant is already allocated for the particular discovered loader comprises: checking an implementation map that maps discovered loaders to implementation tenants.

In one embodiment, allocating the particular implementation tenant comprises: updating an implementation map that maps loaders to implementation tenants with a loader key pointing to the particular implementation tenant.

In one embodiment, allocating the particular implementation tenant comprises: verifying a class loaded in a class loader of the particular implementation tenant.

In one embodiment, the plurality of available implementation tenants have no instrumentation.

In one embodiment, the method further comprises: loading multiple tenants by creating corresponding tenant folders and setting a corresponding configuration to have no instrumentation.

In one embodiment, the telemetry invocation is one of either an application programming interface or a software developer kit.

In one embodiment, using direct telemetry class and/or method calls comprises: loading telemetry classes and any classes loaded by the telemetry classes.

According to the embodiments herein, a second illustrative tangible, non-transitory, computer-readable medium herein may have computer-executable instructions stored thereon that, when executed by a processor on a computer, may cause the computer to perform a method comprising: intercepting runtime calls from a telemetry invocation for method entry to discover loaders; determining whether an implementation tenant is already allocated for a particular discovered loader; allocating, in response to no implementation tenant being already allocated for the particular discovered loader, a particular implementation tenant from a plurality of available implementation tenants, wherein a corresponding loader for the particular implementation tenant is set to delegate from the particular discovered loader; and calling, in response to the particular implementation tenant being allocated or being already allocated for the particular discovered loader, a method entry for the particular implementation tenant to perform an associated interception operation while using direct telemetry class and/or method calls.

Further, according to the embodiments herein a second illustrative apparatus herein may comprise: one or more network interfaces to communicate with a network; a processor coupled to the one or more network interfaces and configured to execute one or more processes; and a memory configured to store a process that is executable by the processor, the process, when executed, configured to: intercept runtime calls from a telemetry invocation for method entry to discover loaders; determine whether an implementation tenant is already allocated for a particular discovered loader; allocate, in response to no implementation tenant being already allocated for the particular discovered loader, a particular implementation tenant from a plurality of available implementation tenants, wherein a corresponding loader for the particular implementation tenant is set to delegate from the particular discovered loader; and call, in response to the particular implementation tenant being allocated or being already allocated for the particular discovered loader, a method entry for the particular implementation tenant to perform an associated interception operation while using direct telemetry class and/or method calls.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java™, TCP, IP, and so on, other suitable technologies, protocols, and associated devices may be used in accordance with the techniques described above, such as, in particular, .NET application classes. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   intercepting, by a process comprising a proxy tenant handler, runtime calls from a telemetry invocation for method entry to discover loaders;
   determining, by the process, whether an implementation tenant is already allocated for a particular discovered loader;
   allocating, by the process and in response to no implementation tenant being already allocated for the particular discovered loader, a particular implementation tenant from a plurality of available implementation tenants, wherein a corresponding loader for the particular implementation tenant is set to delegate from the particular discovered loader to a proxy class loader; and
   calling, by the process in response to the particular implementation tenant being allocated for the particular discovered loader, a method entry for the particular implementation tenant to perform an associated interception operation while using direct telemetry class and/or method calls.

2. The method as in claim 1, further comprising:
   creating the plurality of available implementation tenants during a proxy initialization for the telemetry invocation.

3. The method as in claim 2, wherein creating the plurality of available implementation tenants comprises:
   loading specific handler bytes that will make direct telemetry calls from a jar file into a javassist class;
   renaming the javassist class to match a specific implementation tenant; and
   associating the specific handler bytes with the specific implementation tenant.

4. The method as in claim 1, wherein allocating the particular implementation tenant comprises:
   determining, for the particular implementation tenant, an associated tenant class loader and associated handler bytes; and
   calling, for the associated tenant class loader, a method defineClass with the associated handler bytes.

5. The method as in claim 1, wherein the telemetry invocation is an invocation according to a standardized application performance monitoring solution.

6. The method as in claim 1, wherein the associated interception operation comprises instrumenting telemetry calls.

7. The method as in claim 1, wherein determining whether the implementation tenant is already allocated for the particular discovered loader comprises:
   checking an implementation map that maps discovered loaders to implementation tenants.

8. The method as in claim 1, wherein allocating the particular implementation tenant comprises:
   updating an implementation map that maps loaders to implementation tenants with a loader key pointing to the particular implementation tenant.

9. The method as in claim 1, wherein allocating the particular implementation tenant comprises:
   verifying a class loaded in a class loader of the particular implementation tenant.

10. The method as in claim 1, wherein the plurality of available implementation tenants have no instrumentation.

11. The method as in claim 1, further comprising:
loading multiple tenants by creating corresponding tenant folders and setting a corresponding configuration to have no instrumentation.

12. The method as in claim 1, wherein the telemetry invocation is one of either an application programming interface or a software developer kit.

13. The method as in claim 1, wherein using direct telemetry class and/or method calls comprises:
loading telemetry classes and any classes loaded by the telemetry classes.

14. A tangible, non-transitory, computer-readable medium having computer-executable instructions stored thereon that, when executed by a processor on a computer, cause the computer to perform a method comprising:
intercepting, by a proxy tenant handler, runtime calls from a telemetry invocation for method entry to discover loaders;
determining whether an implementation tenant is already allocated for a particular discovered loader;
allocating, in response to no implementation tenant being already allocated for the particular discovered loader, a particular implementation tenant from a plurality of available implementation tenants, wherein a corresponding loader for the particular implementation tenant is set to delegate from the particular discovered loader to a proxy class loader; and
calling, in response to the particular implementation tenant being allocated for the particular discovered loader, a method entry for the particular implementation tenant to perform an associated interception operation while using direct telemetry class and/or method calls.

15. The tangible, non-transitory, computer-readable medium as in claim 14, wherein the method further comprises:
creating the plurality of available implementation tenants during a proxy initialization for the telemetry invocation.

16. The tangible, non-transitory, computer-readable medium as in claim 15, wherein creating the plurality of available implementation tenants comprises:
loading specific handler bytes that will make direct telemetry calls from a jar file into a javassist class;
renaming the javassist class to match a specific implementation tenant; and
associating the specific handler bytes with the specific implementation tenant.

17. The tangible, non-transitory, computer-readable medium as in claim 14, wherein allocating the particular implementation tenant comprises:
determining, for the particular implementation tenant, an associated tenant class loader and associated handler bytes; and
calling, for the associated tenant class loader, a method defineClass with the associated handler bytes.

18. The tangible, non-transitory, computer-readable medium as in claim 14, wherein the telemetry invocation is an invocation according to a standardized application performance monitoring solution.

19. An apparatus, comprising:
one or more network interfaces to communicate with a network;
a processor coupled to the one or more network interfaces and configured to execute one or more processes; and
a memory storing a process that is executable by the processor, the process, when executed, configured to:
intercept, by a proxy tenant handler, runtime calls from a telemetry invocation for method entry to discover loaders;
determine whether an implementation tenant is already allocated for a particular discovered loader;
allocate, in response to no implementation tenant being already allocated for the particular discovered loader, a particular implementation tenant from a plurality of available implementation tenants, wherein a corresponding loader for the particular implementation tenant is set to delegate from the particular discovered loader to a proxy class loader; and
call, in response to the particular implementation tenant being allocated for the particular discovered loader, a method entry for the particular implementation tenant to perform an associated interception operation while using direct telemetry class and/or method calls.

* * * * *